United States Patent
Sharma et al.

(10) Patent No.: US 10,318,721 B2
(45) Date of Patent: Jun. 11, 2019

(54) SYSTEM AND METHOD FOR PERSON REIDENTIFICATION

(71) Applicant: Apple Inc., Cupertino, CA (US)

(72) Inventors: Vinay Sharma, Cupertino, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 15/168,275

(22) Filed: May 31, 2016

(65) Prior Publication Data

US 2017/0091439 A1    Mar. 30, 2017

Related U.S. Application Data

(60) Provisional application No. 62/234,956, filed on Sep. 30, 2015.

(51) Int. Cl.
| | |
|---|---|
| G06F 21/00 | (2013.01) |
| G06F 21/40 | (2013.01) |
| G06F 21/32 | (2013.01) |
| H04L 29/06 | (2006.01) |
| H04W 12/06 | (2009.01) |

(52) U.S. Cl.
CPC .............. *G06F 21/40* (2013.01); *G06F 21/32* (2013.01); *H04L 63/0861* (2013.01); *H04W 12/06* (2013.01)

(58) Field of Classification Search
CPC ..... G06F 21/40; G06F 21/32; H04L 63/0861; H04W 12/06
See application file for complete search history.

(56) References Cited

U.S. PATENT DOCUMENTS

| | | | |
|---|---|---|---|
| 7,486,810 B1 | 2/2009 | Accapadi | |
| 7,613,929 B2 | 11/2009 | Cohen | |
| 8,254,647 B1 | 8/2012 | Nechyba | |
| 2006/0288234 A1 | 12/2006 | Azar | |
| 2011/0313925 A1* | 12/2011 | Bailey, Jr. | G06Q 40/02 705/44 |
| 2012/0235790 A1 | 9/2012 | Zhao | |
| 2013/0343642 A1 | 12/2013 | Kuo | |
| 2014/0010417 A1* | 1/2014 | Hwang | G06K 9/00288 382/118 |
| 2014/0112553 A1* | 4/2014 | Yamaguchi | G06F 21/32 382/118 |
| 2014/0123275 A1* | 5/2014 | Azar | H04W 12/06 726/19 |
| 2014/0150072 A1* | 5/2014 | Castro | G06F 21/40 726/5 |

(Continued)

OTHER PUBLICATIONS

International Search Report and Written Opinion received in PCT Patent Application No. PCT/US2016/040434, dated Sep. 13, 2016.

*Primary Examiner* — Don G Zhao
(74) *Attorney, Agent, or Firm* — Blank Rome LLP

(57) ABSTRACT

Managing a secure session includes detecting a login event at an electronic device using a first login method to initiate a secure session, capturing an initial image at a same time as the login event, capturing initial sensor data at the same time as the login event, monitoring for changes in the sensor data during the secure session, maintaining the secure session based on the initial sensor data and the monitored changes from the initial sensor data, and during the secure session, permitting access to the electronic device using reidentification.

24 Claims, 5 Drawing Sheets

(56) References Cited

U.S. PATENT DOCUMENTS

| | | | |
|---|---|---|---|
| 2014/0337621 A1* | 11/2014 | Nakhimov | G06F 1/163 713/168 |
| 2015/0135021 A1* | 5/2015 | Robison | G06F 21/6263 714/55 |
| 2015/0135298 A1* | 5/2015 | Robison | G06F 21/31 726/10 |
| 2016/0063503 A1* | 3/2016 | Kobres | G06F 21/316 705/18 |
| 2016/0072802 A1* | 3/2016 | Hoyos | G06F 17/30867 726/5 |
| 2016/0239649 A1* | 8/2016 | Zhao | G06F 21/316 |
| 2016/0307030 A1* | 10/2016 | Samet | G06K 9/00288 |
| 2017/0026836 A1* | 1/2017 | Samangouei | H04W 12/06 |
| 2017/0103194 A1* | 4/2017 | Wechsler | G06F 21/316 |

* cited by examiner

SYSTEM AND METHOD FOR PERSON REIDENTIFICATION

BACKGROUND

This disclosure relates generally to the field of electronic device security, and more particularly to the field of person reidentification. More specifically, this disclosure relates to generating and maintaining a secure session based on a login image and monitored sensor data.

Electronic devices, such as laptops, cellular telephones, tablet devices, and other types of personal electronic devices typically provide a level of login security in order to access the device. For example, many devices allow users to setup passwords that are required in order to use the device. Other types of authentication that may be used are biometrics, such as a fingerprint, or facial recognition. Once a user is authenticated, applications and other data on the device are accessible.

One drawback in this type of authentication is that once a user is authenticated, the device may be accessible to anyone until the user logs out, or the secure session expires. Thus, once a user initiates a session on a device, the device is left vulnerable to other unauthorized users.

SUMMARY

In one embodiment, a method for managing a secure session is disclosed. The method includes detecting a login event at an electronic device using a first login method to initiate a secure session, capturing an initial image at a same time as the login event, capturing initial sensor data at the same time as the login event, monitoring for changes in the sensor data during the secure session, maintaining the secure session based on the login sensor data and the monitored changes in the sensor data, and during the secure session, permitting access to the electronic device using reidentification.

In another embodiment, the method may be embodied in computer executable program code and stored in a non-transitory storage device. In yet another embodiment, the method may be implemented by an electronic device having image capture capabilities.

DETAILED DESCRIPTION

Figure 1:
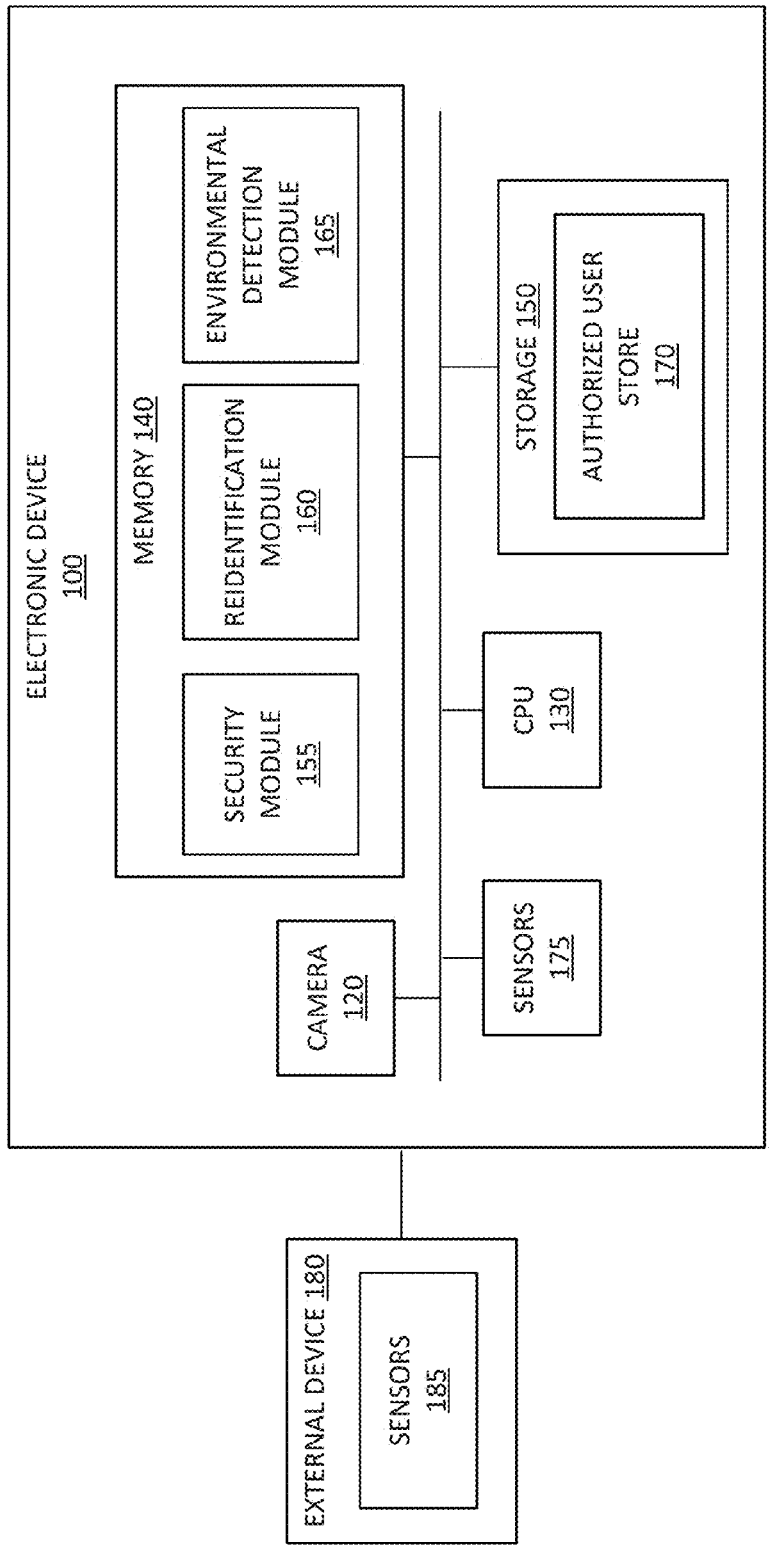
FIG. 1 shows, in block diagram form, a simplified block diagram of an electronic device according to one or more embodiments.

This disclosure pertains to systems, methods, and computer readable media for generating and monitoring a secure session. In general, techniques are disclosed for generating and maintaining a secure session when a user is authenticated on a device. Upon detecting a login event at a device, embodiments include capturing an initial image, capturing initial sensor data, and maintaining the secure session based on monitored changes in the sensor data and updated images. In one or more embodiments, the secure session is maintained by monitoring changes in the sensor data to determine whether the user may be reauthenticated using reidentification, for example using facial recognition. Further, in one or more embodiments, a user may bypass other login methods and login using reidentification based on previous enrollment data for a particular environment.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed subject matter. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram are presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the inventive subject matter. Reference in this disclosure to "one embodiment" or to "an embodiment" means that a particular feature, structure, or characteristic described in connection with the embodiment is included in at least one embodiment of the invention, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

FIG. 1 shows, in block diagram form, an overall view of a system diagram capable of supporting person reidentification, according to one or more embodiments. Specifically, FIG. 1 depicts an electronic device 100 that is a computer system. Electronic Device 100 may be connected to other network devices across a network, such as mobile devices, tablet devices, desktop devices, as well as network storage devices such as servers and the like. In various embodiments, Electronic Device 100 may comprise a desktop computer, a laptop computer, a video-game console, an embedded device, a mobile phone, tablet computer, personal digital assistant, portable music/video player, or any other electronic device that includes a camera system.

Electronic Device 100 may include a central processing unit (CPU) 130. Processor 130 may be a system-on-chip such as those found in mobile devices and include one or more dedicated graphics processing units (GPUs). Electronic Device 100 may also include a memory 140 and storage 150. Memory 140 and storage 150 may each include one or more different types of memory, which may be used for performing device functions in conjunction with CPU 130. For example, memory 140 and storage 150 may include cache, ROM, and/or RAM. Memory 140 and storage 150 may store various programming modules during execution, including security module 155, reidentification module 160, and environmental detection module 165. Electronic device 100 may also include a camera 120. Camera 120 may include an image sensor, a lens stack, and other components that may be used to capture images. In one or more embodiments, the camera is part of the user device, such as the Electronic Device 100, and may be front-facing such that the camera is able to capture an image of a user in front of a screen.

In one or more embodiments, reidentification module 160 is configured to identify one or more users by an image. An image may include, for example, video, live photos, and 3D captures. In one or more embodiments, reidentification module 160 obtains images captured, for example, by camera 120 and verifies the identity of one or more people in the image. Reidentification module 160 may, for example, compare facial features in a captured image with facial features previously determined to belong to a particular user. For example, reidentification module 160 may identify facial features in an image captured by camera 120 and compare the identified facial features with facial features previously determined to belong to an authorized user. In one or more embodiments, a face signature or a face feature vector may be securely stored for facial recognition, such as in a secure memory within system 100. In one or more embodiments, associations between facial features or other facial recognition data and authorized users may be stored, for example, in authorized user store 170. In one or more embodiments, reidentification module 160 may use an image to identify a user in any additional manner.

In one or more embodiments, authorized user store 170 may be stored in storage 150. Storage 150 may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, RAM BUS DRAM (RDRAM) (RAMBUS is a registered trademark of Rambus Inc.), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

In one or more embodiments, authorized user store 170 may include data used to determine that a particular authentication feature belongs to a user. In one or more embodiments, authorized user store 170 may store authentication data in the form of a tree, a table, a database, or any other kind of data structure. Although authorized user store 170 is depicted as part of Electronic Device 100, in one or more embodiments, authentication data may additionally or alternatively be stored in a data store in a network device, such as a remote system or network storage, connected to the Electronic Device 100 across a network.

Environmental detection module 165 may process environmental factors or other sensor data obtained by one or more sensors within or operatively connected to Electronic Device 100. For example, in one or more embodiments, the environmental detection module 165 may consider sensor data from sensors that are part of electronic device 100, such as sensors 175. Environmental detection module 165 may also consider sensor data from sensors in devices external to electronic device 100, such as sensors 185 in external device 180. For example, environmental detection module 165 may consider sensor data from user devices connected to electronic device 100, such as smart watches, mobile phones, activity trackers, and the like. Sensors 175 or 185 may also include other cameras, such as a depth camera, an infrared camera, or another sensing device with a 2D sensor array.

In one or more embodiments, the environmental detection module 165 may monitor environmental conditions such as ambient light, location information, time of day, and other environmental factors related to the electronic device 100. In one or more embodiments, the environmental detection module 165 may capture sensor data at the time a user securely logs in to the electronic device 100, such as a login event. In one or more embodiments, the environmental detection module 165 may store the captured data for the environmental factors, for example, as associated with the authorized user in authorized user store 170.

In one or more embodiments, the security module 155 may support user authentication processes. For example, security module 155 may manage user authentication for a device, such as Electronic Device 100. In one or more embodiments, security module 155 may manage password authentication, biometric authentication, voice authentication, and the like.

In addition, security module 155 may also manage authentication through person reidentification. That is, in one or more embodiments, security module 155 may generate, maintain, or restart a secure session based on authentication in accordance with this disclosure. The security module 155 may manage an initial secure login, for example, by a user using, for example, a password or other login means. In one or more embodiments, the security module 155 may trigger camera 120 to capture an initial image of the user entering login information, and may trigger environmental detection module 165 to capture sensor data related to the environment or context of the electronic device. For purposes of clarity, the term "image" as used below may correspond to any type of data that contributes to facial recognition, such as a 2D image, feature vectors, facial models, video images, and the like. In one or more embodiments, during the secure session, the security module 155 may dynamically maintain the secure session by monitoring for changes in the sensor data. The sensor data may be continuously monitored, or may be occasionally or periodically monitoring the sensor data. In one or more embodiments, the security module 155 may maintain the secure session by allowing a user to access the device using reidentification when it is determined that reidentification could present a positive match based on the monitored sensor data. That is, if a login image is stored, for example in authorized user store 170, as associated with sensor data that is substantially similar to the monitored sensor data, then reidentification may be used. For example, a positive reidentification may be possible if the ambient lighting is similar to ambient lighting data stored in association with a previous login image in authorized user store 170. In one or more embodiments, the stored login image used for reidentification may be stored as part of a current secure session, or in association with a previous secure session.

In one or more embodiments, the security module 155 may calculate a confidence score based on the sensor data. For example, in one or more embodiments, the security module 155 may calculate the confidence score based on sensor data detected at the time of the secure login and, in one or more embodiments, sensor data or information stored in authorized user store 170 as associated with previous captured images. Thus, for example, if ambient light data indicates that the lighting is significantly different than at the time of the secure login, then the security module may calculate a lower confidence score than if the ambient light remains similar. Thus, in one or more embodiments, the confidence score indicates a likelihood of a positive identification of a user using reidentification, for example using as facial recognition, based on the conditions in which the initial image was captured and the current environmental conditions. In one or more embodiments, the confidence score may also indicate a likelihood of a positive identification of a user using facial recognition based on the conditions in which other images have been captured and stored, for example, in authorized user store 170.

In one or more embodiments during or after the secure session, the security module may capture an updated image using camera 120. The security module 155 may use reidentification to identify the user. For example, the reidentification module 160 may compare facial features of the updated image to the facial features of the login image to determine that the authenticated user is gazing at the electronic device 100. In response to determining that the authenticated user is the user in the updated image, the security module 155 may maintain or start the secure session.

Figure 2:
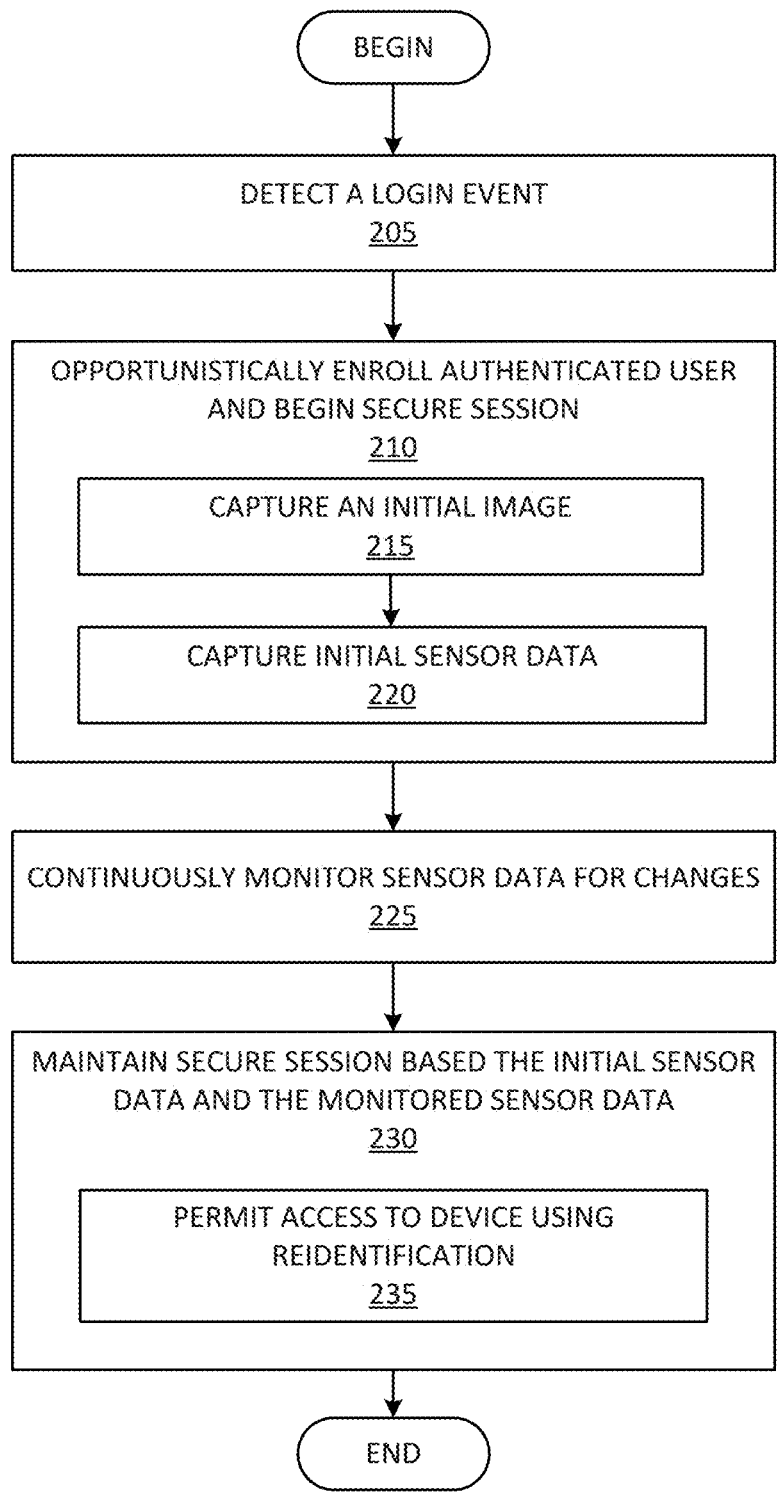
FIG. 2 shows, in flow chart form, a method for generating and monitoring a secure session in accordance with one or more embodiments.

Turning to FIG. 2, an example method for generating and maintaining a secure session is depicted in the form of a flow chart. It should be understood that the various components of the flow chart described below may be performed in a different order or simultaneously, and some components may even be omitted in one or more embodiments. The flow chart begins at 205, when a login event is detected. In one or more embodiments, the detected login event may be an authentication of a user logging into a device using a login method such as a password, biometric information, and the like.

The method continues at 210 where the security module opportunistically enrolls the user and generates a secure session. In one or more embodiments, the user may already be enrolled, and additional data regarding the user may be stored during the opportunistic enrollment. As an example, a user may enter login information into a laptop or other personal device in order to gain access to the device's functionality. In one or more embodiments, beginning the secure session includes, at 215, capturing an initial image. For example, the device may include a front facing camera (i.e., a camera facing away from a display device from which an initial login screen may be seen) which captures an image of the user as the user is logging into the system, or immediately after the user is logging into the system. In one or more embodiments, the security module, for example, may trigger the front facing camera to capture an image at or near the time of the secure login. In doing so, the camera may capture an image of a user who is authenticated at the secure login.

In one or more embodiments, generating a secure session may also include initiating capturing initial sensor data at 220. In one or more embodiments, the environmental detection module, for example, may capture initial sensor data at or near the time of the secure login. The initial sensor data may include, for example, location information determined using a GPS device, time information, network connectivity information, ambient light, image data, audio data, temperature data, barometer data, altimeter data, gyroscope data, and the like. The sensor data may be captured from sensors that are part of the electronic device, or are communicably coupled to the electronic device. The initial login sensor data may be stored such that sensor data monitored during the secure session may be compared against the initial sensor data. In addition, the initial sensor data may be stored to be used in comparing sensor data in a future secure session.

The method continues at 225, and the sensor data is continuously monitored. In one or more embodiments, the sensor data may be monitored occasionally or periodically through the secure session. The flowchart continues at 230 and the secure session is maintained based on a comparison of the initial sensor data to the monitored sensor data. In one or more embodiments, at 235, maintaining the secure session allows a user to bypass other login techniques and use reidentification to access the device.

Figure 3:
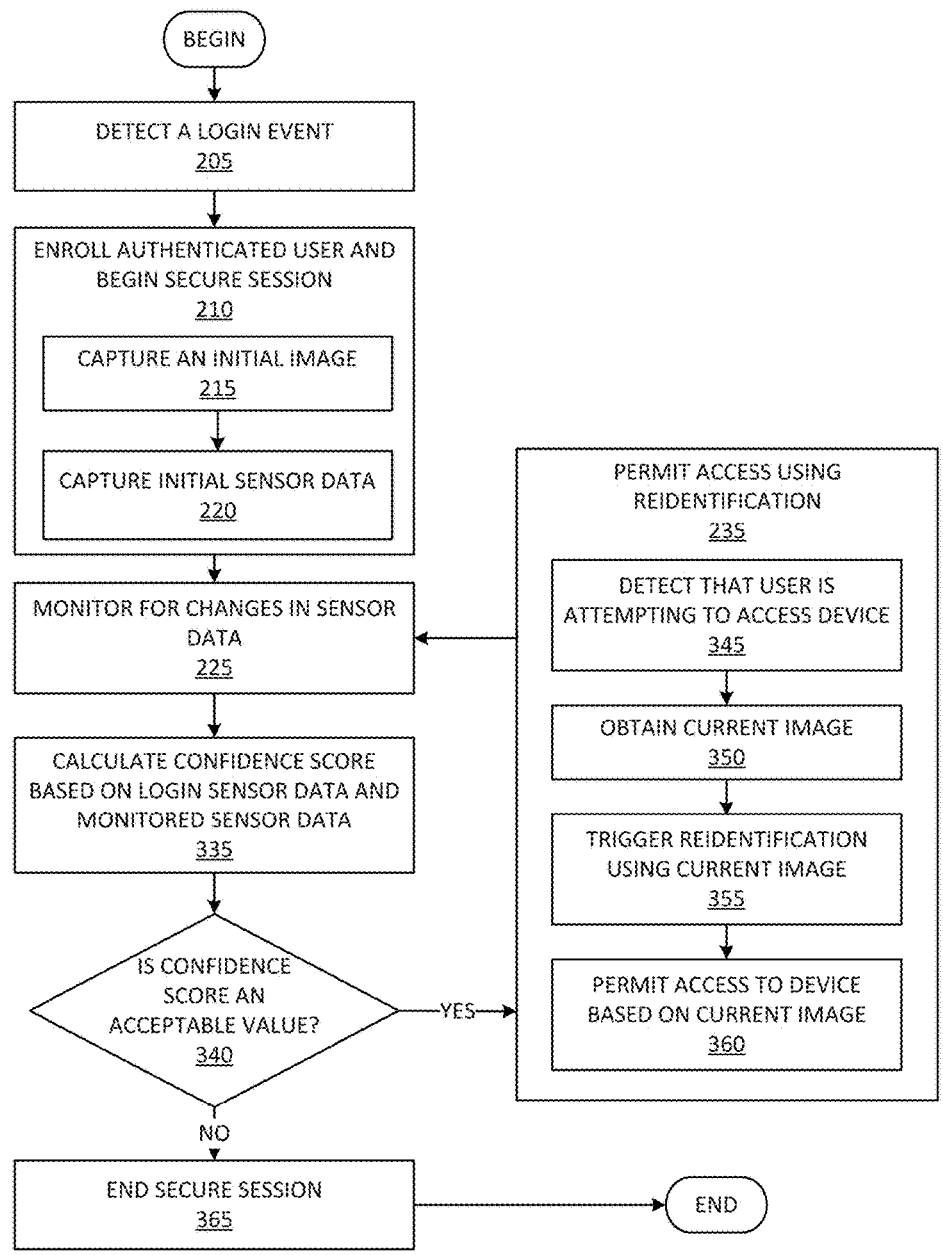
FIG. 3 shows, in flow chart form, a method for generating and monitoring a secure session using a confidence score in accordance with one or more embodiments.

FIG. 3 shows, in flow chart form, a method for generating and monitoring a secure session using a confidence score in accordance with one or more embodiments. FIG. 3 includes some of the same actions included in FIG. 2, including detecting (205) a login event, beginning (210) a secure session, including capturing (215) an initial image and capturing (220) initial sensor data, and monitoring (225) for changes in the sensor data.

FIG. 3 differs from FIG. 2 in that following for changes in the sensor data, flowchart continues at 335 and security module calculates a confidence score based on the login sensor data and the monitored sensor data. In one or more embodiments, the security module may calculate a confidence score regarding the authorization of a current user based on the monitored sensor data. For example, if the difference between the login sensor data and monitored sensor data exceeds a predetermined threshold, the security module may calculate a lower confidence score than if the monitored sensor data more closely matched the login sensor data.

The flowchart continues at 340 where a determination is made regarding whether the confidence score is an acceptable value. For example, the security module may determine that the calculated confidence score does not meet a particular predefined acceptable value threshold, whether that threshold is predefined, or dynamically defined based on monitored values. The acceptable value threshold may be defined, for example, based on a percentage or other comparison to an initial calculated confidence value, or based on particular measured parameter from the sensor data. For example, in one or more embodiments, the acceptable value threshold may be defined as a function of one or more types of sensor data, or may be different based on the types or values of sensor data monitored.

If, at 340 it is determined that the confidence score is an acceptable value, then the security module continues to 235 and the security module permits access to the device using reidentification. Permitting access using reidentification may include active steps, such as those depicted in blocks 345-360. Particularly, in one or more embodiments, maintaining the secure session may include at 345, detecting that a user is attempting to access the device. In one more embodiments, the user may actively interface with the device, or the device may sense that the user has moved the device. The flowchart continues at 350, and the camera 120 obtains a current image. In one or more embodiments, the current image may be captured as the user is gazing at the camera or is in view of the camera such that the user may be identified. At 355, reidentification is triggered using the updated image. In one or more embodiments, the reidentification module 160 may compare the captured image to the original login image to authenticate the user. In one or more embodiments, the reidentification module 160 may alternatively, or additionally, compare the captured image to other stored images, which are associated with similar sensor data. The flow chart continues at 360, and the security module 155 allows the user to access the device based on reidentification and the current image.

Returning to decision block 340, if it is determined that the confidence score is no longer an acceptable value, then the flowchart continues to 365 and the security module ends the secured session. According to one or more embodiments, the secure session may be ended based on the monitored sensor data regardless of logout features associated with the initial method of the login event at block 205. For example, if the initial login method indicates a timeout feature that causes the session to end after a particular amount of time. In one or more embodiments, the security module may override the timeout feature if the confidence score remains an acceptable value based on environmental factors. In one or more embodiments, automatic logout features of the initial login method may be taken into consideration when calculating a confidence score. For example, if the initial login method dictates that the user should be logged out and the session should end based on a certain set of conditions, the confidence score may be lower when those conditions are met. In one or more embodiments of the invention, the logout features of the initial login method will override the sensor data and the secure session will end regardless of the confidence score. In other embodiments, if the confidence score determined in accordance with 335 is less than another value, the secure session may be terminated before the scheduled timeout feature. That is, in some embodiments multiple thresholds may be utilized.

In one or more embodiments, when the secure session is ended, the user may be required to use an additional authentication method other than reidentification. For example, when the user attempts to login again, the user may be required to use a password or biometrics such as a fingerprint, in order to be authenticated. However, in one or more embodiments, when the user logs in using the additional methods, the user may also be enrolled along with the sensor data captured at the time of the login, thereby generating a new secure session.

For purposes of an example, a user may log into her device in a local coffee shop using a password. At the time the user is authenticated using the password, or substantially around the time the user is authenticated using the password, an image of the user may be captured, for example, by a front facing camera on her device. As long as the user stays in the same location (i.e., the coffee shop), the user can maintain the secure session, merely by facial recognition. According to one or more embodiments, once the user leaves the location, the confidence score will drop, perhaps to an unacceptable value, where after the secure session will end. That is, in one or more embodiments, when the user remains in a same location, reidentification methods will more likely find a positive match of the user than when the user leaves the location because sensor data that affect the reidentification will remain similar.

As another example, a user may log into her device in an office. Over the next few hours, the user may access the device simply by appearing in updated images captured by a camera connected to the device. If the user leaves her office, the ambient light may change and cause the confidence score to drop, perhaps to an unacceptable value, where after the secure session will end.

The above examples are merely intended to provide the reader with a better understanding of embodiments of the inventive subject matter and are not intended to limit any one or more embodiments of the invention.

Figure 4:
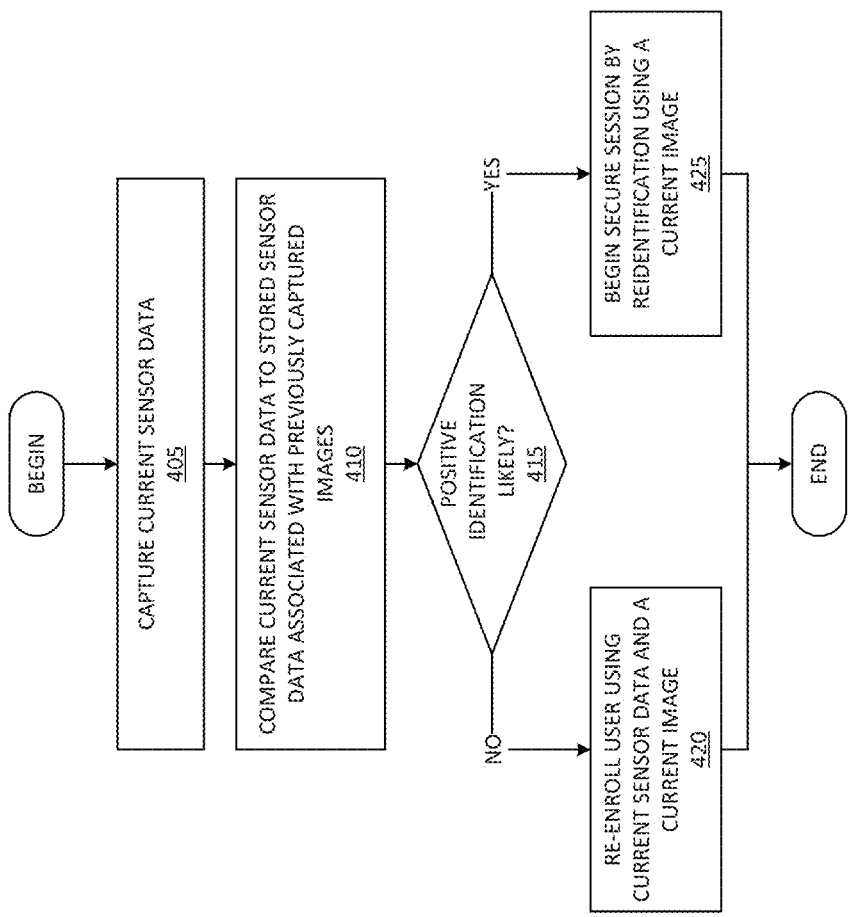
FIG. 4 shows, in flow chart form, a method for person reidentification in accordance with one or more embodiments.

Referring now to FIG. 4, a flow chart depicts an example method of starting a secure session using person reidentification. In one or more embodiments, after a confidence score is no longer an acceptable value, a user may restart the secure session by gazing at the camera, or merely appearing in front of the camera when an updated image is captured. Over time, a user may be authenticated in a number of environments. In one or more embodiments, authorized user store 170 may include a number of user images and corresponding sensor data. Thus, for example, if a user uses their computer at their office during the day and then brings it home, reidentification may allow the security module 155 to authenticate the user using only reidentification. The reidentification may be based on previously stored environmental data and corresponding images, even though the best match for the environmental data is not from the most recent secure session. It should be understood that the example shown in FIG. 4 is depicted merely for purposes of clarity for the reader, and is not intended to limit the disclosure.

The method begins at 405 where the current sensor data is captured. In one or more embodiments, the sensor data may come from sensors on the device the user is attempting to access, or may be communicably coupled to the device. The flowchart continues at 410 and the current sensor data is compared to stored sensor data associated with previous sessions. In one or more embodiments, the current sensor data may be compared to previously captured sensor data stored in authorized user store 170 as associated with previous secure sessions for authorized users.

The flowchart continues at 415 and a determination is made regarding whether a positive identification is likely. In one or more embodiments, the determination may be based on a confidence value as described above. Further, in one or more embodiments, determining whether a positive identification is likely includes determining whether facial recognition might be successful based on the current sensor data and sensor data captured coincident with previous login images for previous secure sessions.

If a determination is made at 415 that a positive identification is not likely, then the flowchart continues at 420 and the user is re-enrolled. That is, in one or more embodiments, the user must utilize a second login method, such as a password or biometric identification, and a current image and sensor data may be captured and stored.

Returning to decision block 415, if it is determined that a positive identification is likely, then the flowchart continues at 425, then the secure session begins using reidentification. In one or more embodiments, the reidentification module 160 captures a current image and compares the current image to stored images associated with sensor data similar to current sensor data. The reidentification module may, for example, compare facial features in the current image to facial features of the stored images. In one or more embodiments, the captured image and current sensor data is stored in authorized user store and may be used for future reidentification of the user.

Figure 5:
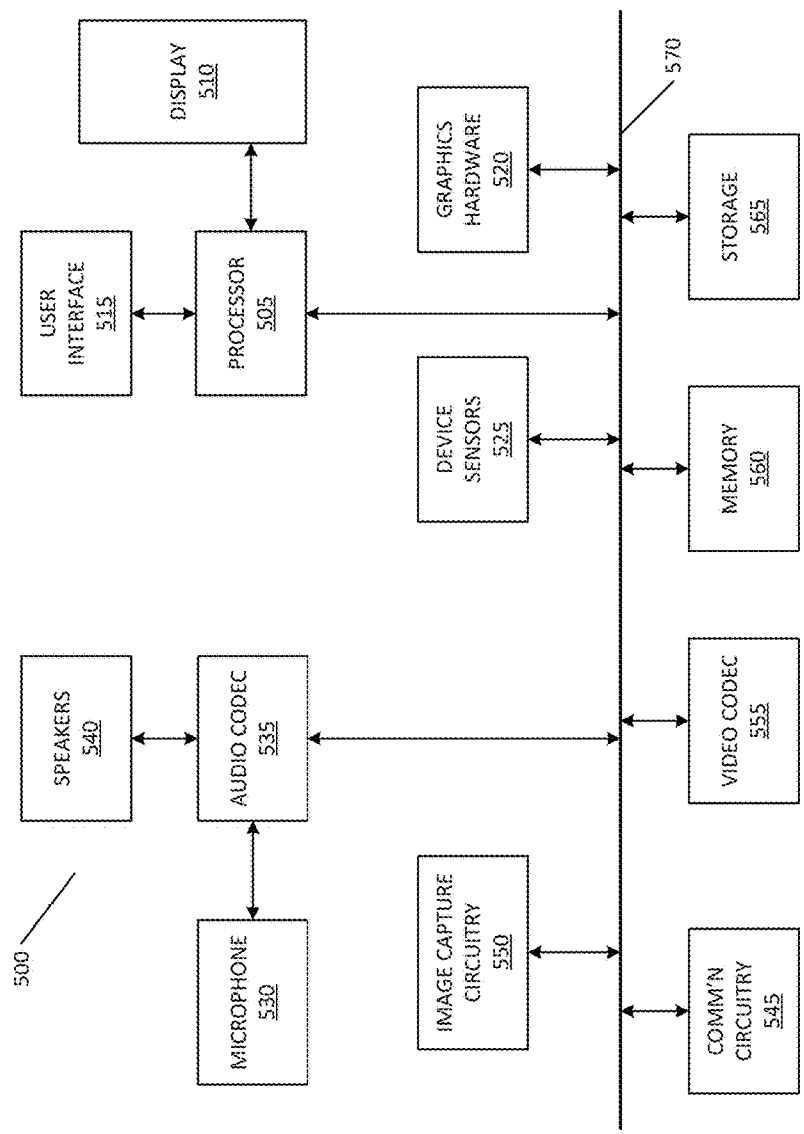
FIG. 5 shows, in block diagram form, a simplified multifunctional device according to one or more embodiments.

Referring now to FIG. 5, a simplified functional block diagram of illustrative multifunction electronic device 500 is shown according to one embodiment. Multifunction electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550 video codec(s) 555, memory 560, storage device 565, and communications bus 570. Multifunction electronic device 500 may be, for example, a digital camera or a personal electronic device such as a personal digital assistant (PDA), personal music player, mobile telephone, or a tablet computer. In some embodiments, multifunction electronic device 500 corresponds to Electronic Device 100.

Processor 505 may execute instructions necessary to carry out or control the operation of many functions performed by device 500 (e.g., such as the generation and/or processing of images in accordance with this disclosure). Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

In practice, the environmental detection module may monitor low-power sensor data, such as sensor data that requires less power to monitor than the reidentification feature, such as facial recognition. Thus, utilizing reidentification only when it is determined that reidentification will likely be successful based on compared sensor data may provide power and other resource savings. In one or more embodiments, reidentification may occur rapidly, for example greater than 30 frames per second, for a better user experience. In one or more embodiments, the camera may capture multiple initial images of the same user so that facial recognition becomes more efficient over time. For example, during the secure session, because the security module calculates a high confidence score, the security module may occasionally capture one or more additional images of the user and store the images, or facial features from the images, in the authorized user store 170. As another example, each time a user uses the same login information, the security module 155 may capture those initial images and store the additional login images in the authorized user store 170 such that the security module 155 can associate particular login information with a set of images that include the user associated with that login information. Thus, the reidentification module 160 may rely on the entire set of images to authenticate a user using facial recognition, according to one or more embodiments. Any method of reidentification allowing for the identification of a same user in multiple images may be utilized. Finally, variations of the above-described embodiments may be used in combination with each other.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for managing a secure session, comprising:
   detecting a login event at an electronic device using a first login method to initiate a secure session for a first user;
   capturing an initial login image of the first user at a same time as the login event;
   capturing initial sensor data at the same time as the login event, wherein the initial sensor data comprises data relating to one or more environmental factors;
   monitoring for changes in the initial sensor data during the secure session;
   maintaining the secure session for the monitoring based on the initial sensor data and the monitored changes in the initial sensor data, wherein the secure session enables monitoring the one or more environmental factors and comprises a time period during which the first user is allowed to be reauthenticated by the electronic device without using the first login method; and
   during the secure session, permitting the first user to access the electronic device based on a successful completion of a second login method configured to perform reidentification of the first user, wherein the second login method is different than the first login method.

2. The method of claim 1, wherein maintaining the secure session comprises:
   comparing the monitored changes in the initial sensor data to the initial sensor data;
   determining a confidence score based on the comparison; and maintaining the secure session for the monitoring in response to further determining that the confidence score satisfies an acceptable value.

3. The method of claim 2, wherein the confidence score indicates a likelihood of a positive reidentification of the first user based on the monitored changes in the initial sensor data.

4. The method of claim 2, further comprising:
terminating the secure session in response to determining the confidence score does not satisfy an acceptable value.

5. The method of claim 4, further comprising, in response to terminating the secure session:
capturing current sensor data;
comparing the current sensor data to sensor data captured at the same time as a previous login event; and
in response to determining that the current sensor data is a match with sensor data captured at the same time as a previous login event, permitting the first user to access the electronic device based on successful completion of the second login method.

6. The method of claim 1, wherein permitting the first user to access the electronic device based on successful completion of a second login method configured to perform reidentification of the first user comprises:
capturing a current login image of the first user; and
performing reidentification of the first user based on a comparison of the current login image to the initial login image.

7. The method of claim 1, wherein monitoring for changes in the initial sensor data during the secure session comprises receiving data from one or more sensors of an external electronic device operatively connected to the electronic device.

8. The method of claim 1, wherein the first login method comprises the electronic device receiving entry of a password for the first user, and wherein the second login method comprises the electronic device performing facial recognition on a captured image of the first user.

9. A system for managing user authentication, comprising:
a camera;
one or more processors; and
a memory operatively coupled to the one or more processors and comprising computer code configured to cause the one or more processors to:
detect a login event at an electronic device using a first login method to initiate a secure session for a first user;
capture an initial login image of the first user at a same time as the login event using the camera;
capture initial sensor data at the same time as the login event, wherein the initial sensor data comprises data relating to one or more environmental factors;
monitor for changes in the initial sensor data during the secure session;
maintain the secure session for the monitoring based on the initial sensor data and the monitored changes in the initial sensor data, wherein the secure session enables monitoring the one or more environmental factors and comprises a time period during which the first user is allowed to be reauthenticated by the electronic device without using the first login method; and
during the secure session, permit the first user to access the electronic device based on successful completion of a second login method configured to perform reidentification of the first user, wherein the second login method is different than the first login method.

10. The system of claim 9, the computer code further configured to cause the one or more processors to:
compare the monitored changes in the sensor data to the initial sensor data;
determine a confidence score based on the comparison; and
maintain the secure session for the monitoring in response to further determining that the confidence score satisfies an acceptable value.

11. The system of claim 10, wherein the confidence score indicates a likelihood of a positive reidentification of the first user based on the monitored changes in the initial sensor data.

12. The system of claim 10, further comprises computer code configured to cause the one or more processors to:
terminate the secure session in response to determining the confidence score does not satisfy an acceptable value.

13. The system of claim 12, further comprises computer code configured to cause the one or more processors to, in response to terminating the secure session:
capture current sensor data;
compare the current sensor data to sensor data captured at the same time as a previous login event; and
in response to determining that the current sensor data is a match with sensor data captured at the same time as a previous login event, permit the first user to access the electronic device based on successful completion of the second login method.

14. The system of claim 9, wherein the computer code configured to cause one or more processors to permit the first user to access the electronic device based on successful completion of a second login method configured to perform reidentification of the first user further comprises computer code configured to cause the one or more processors to:
capture a current login image of the first user; and
perform reidentification of the first user based on a comparison of the current login image to the initial login image.

15. The system of claim 9, wherein the computer code configured to cause one or more processors to monitor for changes in the initial sensor data during the secure session further comprises computer code configured to cause the one or more processors to: receive data from one or more sensors of an external electronic device operatively connected to the electronic device.

16. The system of claim 9, wherein the first login method comprises the electronic device receiving entry of a password for the first user, and wherein the second login method comprises the electronic device performing facial recognition on a captured image of the first user.

17. A non-transitory computer readable medium comprising computer code executable by one or more processors to:
detect a login event at an electronic device using a first login method to initiate a secure session for a first user;
capture an initial login image of the first user at a same time as the login event;
capture initial sensor data at the same time as the login event, wherein the initial sensor data comprises data relating to one or more environmental factors;
monitor for changes in the initial sensor data during the secure session;
maintain the secure session for the monitoring based on the initial sensor data and the monitored changes in the initial sensor data, wherein the secure session enables monitoring the one or more environmental factors and comprises a time period during which the first user is allowed to be reauthenticated by the electronic device without using the first login method; and during the secure session, permit the first user to access the electronic device based on successful completion of a second login method configured to perform reidentification of the first user, wherein the second login method is different than the first login method.

18. The non-transitory computer readable medium of claim 17, wherein the computer code is further executable by one or more processors to:

compare the monitored changes in the sensor data to the initial sensor data;

determine a confidence score based on the comparison; and maintain the secure session for the monitoring in response to further determining that the confidence score satisfies an acceptable value.

19. The non-transitory computer readable medium of claim 18, wherein the confidence score indicates a likelihood of a positive reidentification of the first user based on the monitored changes in the initial sensor data.

20. The non-transitory computer readable medium of claim 18, wherein the computer code further comprises computer code configured to cause the one or more processors to:

terminate the secure session in response to determining the confidence score does not satisfy an acceptable value.

21. The non-transitory computer readable medium of claim 20, wherein, in response to causing the one or more processors to terminate the secure session, the one or more processors are further configured to:

capture current sensor data;

compare the current sensor data captured at the same time as a previous login event; and in response to determining that the current sensor data is a match with sensor data captured at the same time as a previous login event, permit the first user to access the electronic device based on successful completion of the second login method.

22. The non-transitory computer readable medium of claim 17, wherein the computer code to permit the first user to access the electronic device based on successful completion of a second login method configured to perform reidentification of the first user further comprises computer code configured to cause one or more processors to:

capture a current login image of the first user; and perform reidentification of the first user based on a comparison of the current login image to the initial login image.

23. The non-transitory computer readable medium of claim 17, wherein the computer code to cause the one or more processors to monitor for changes in the initial sensor data during the secure session further comprises computer code to cause the one or more processors to receive data from one or more sensors of an external electronic device operatively connected to the electronic device.

24. The non-transitory computer readable medium of claim 17, wherein the first login method comprises the electronic device receiving entry of a password for the first user, and wherein the second login method comprises the electronic device performing facial recognition on a captured image of the first user.

* * * * *